Patented June 20, 1944

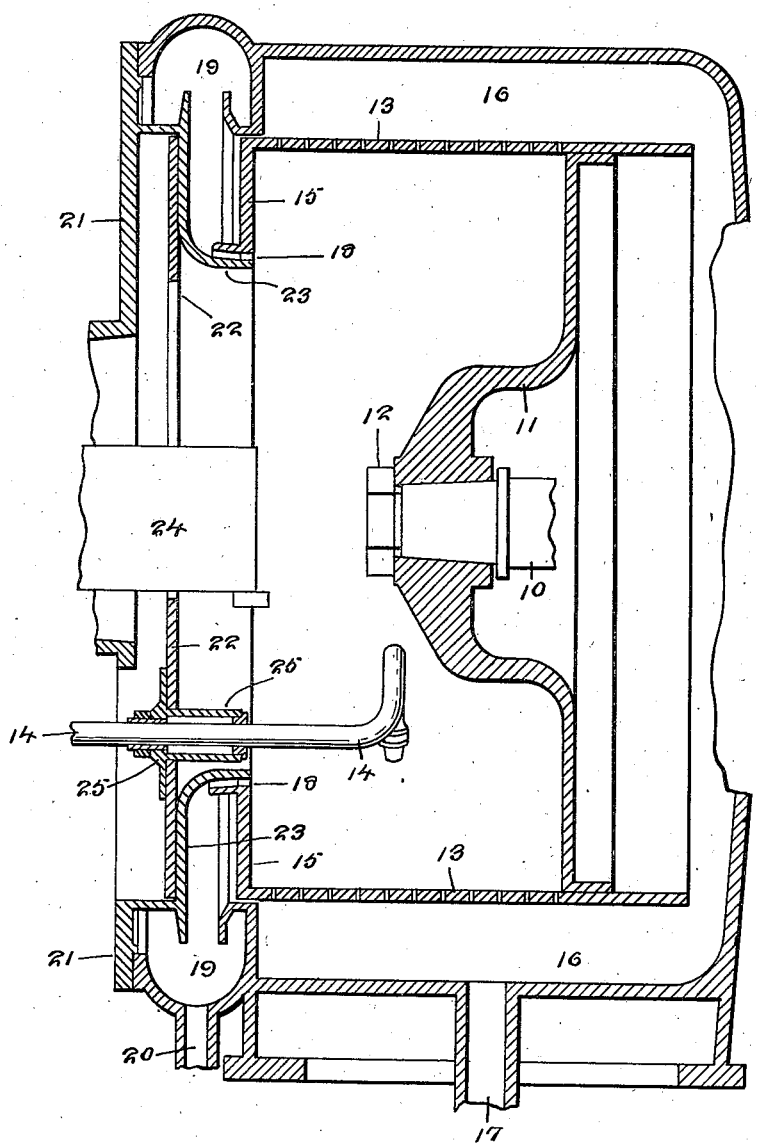

2,351,970

UNITED STATES PATENT OFFICE 2,351,970

PROCESS FOR THE SEPARATION OF YEAST FROM YEAST SUSPENSIONS

Max Petrus Jozef Maria Jansen, Amsterdam, Netherlands; vested in the Alien Property Custodian Application December 20, 1939, Serial No. 310,261
In the Netherlands December 22, 1938

5 Claims. (Cl. 210—67)

In the commercial manufacture of compressed yeast for baking, the separation of the yeast has largely been accomplished in filter presses. Such practice has been long recognized to be attended with many drawbacks, and various other methods have been tried.

The use of a rotating vacuum filter was tried with some degree of success, but such a method gives a fluid yeast mass containing only 25 to 26% of dry matter. Such product is too moist, does not keep well, and cannot be shipped for long distances, particularly in warm climates.

Processes employing centrifugal strainers or centrifugal filters, or in other cases centrifugal clarifiers or overflow centrifuges, as heretofore tried, have not given very satisfactory results.

In accordance with the present invention it has been found readily possible to get a compressed baker's yeast containing 28 to 30% of dry matter by employing a centrifugal filter having a filter cloth, and having a suitable inlet for the aqueous suspension of the yeast, the suspension flowing in much more rapidly than the water content of the same can filter through the filter cloth, allowing this to continue until the rotating bowl of the centrifugal filter becomes filled with liquid. Then the inflow of the suspension is continued, whereby the centrifugal filter acts as a centrifugal clarifier or overflow centrifuge allowing clear liquid, containing no considerable amount of yeast, to overflow an internal ring dam at one end of the centrifugal filter. This inflow of the suspension of yeast is so continued until the bowl is nearly filled with solid yeast. Then suddenly, the overflowing liquid passing the ring dam becomes very turbid, about like the suspension of yeast being run in, and then the inflow of suspension is at once stopped. The operation of the centrifugal is then continued at normal speed until the small amount of aqueous liquid in the central part of the centrifugal filter passes out through the mass of yeast therein, and through the filter cloth.

In this manner, there is left in the centrifugal filter, an annular (hollow cylindrical) cake of perfectly homogeneous clean yeast mass, of any desired content of dry material from 28% up to 30%, depending on the speed of rotation and the length of time that the centrifugal filter is left running after shutting off the inflow of suspension of yeast.

When this condition has been secured, the yeast (or most of it) can be removed from the centrifugal (while the latter is left running), by a peeling knife or peeling chisel, or other known device for removing a filter-cake from a rotating centrifugal.

After the emptying of the centrifugal filter, while preferably leaving a thin layer only of the yeast on the filter cloth (so as not to disturb the latter) the operations are repeated, opening the suspension inlet, allowing to fill with solid yeast and yeast suspension until the overflowing effluent again suddenly becomes turbid, shutting off the inflow, spinning to remove the small amount of aqueous liquid, and again removing the cake. It becomes only necessary to shut down the centrifugal for repairs or for putting in a new filter cloth if the one in use gets damaged, e. g. by the peeling knife.

Thus it will be seen that the centrifugal filter acts first as merely a centrifugal filter until the same becomes practically filled with a layer of filter cake overlain by a layer of suspension, then it operates as an overflow centrifugal and also centrifuge filter, up until the overflowing liquid suddenly becomes turbid, whereupon the inflow of suspension is quickly shut off. Then the centrifugal continues to act as a centrifugal filter only, until the desired degree of dryness in the filter cake (compressed yeast) is secured, after which the cake is removed from the centrifugal, all preferably without stopping the rotation of the bowl.

The yeast from the peeling knife is conveyed directly to a packaging machine, e. g., by an inclined chute or by an automatic conveyor, whereby it is unnecessary for the workmen to handle the compressed yeast. This makes for cleanliness, and for good keeping quality of the yeast.

The yeast can be packaged into commercial packages, automatically, the packages being, e. g., a pound, a kilo etc.

The liquid effluent from the centrifugal filter may be run to a tank or sewer, and the liquid effluent from the overflow dam may be run to the tank or sewer until just before time for this effluent to become turbid, when it can be run to a special tank for recovery of that small part of the yeast which will be carried by the turbid effluent.

The propagation and preliminary washing of the yeast can be performed in the usual or any approved manner.

This system of separation of the yeast from the suspension thereof has been found to be highly efficient, and the equipment therefor is small, taking up much less space than a filter press of equal capacity. It also effects a large saving in labor cost and amount of filter cloth needed. After a particular installation has been run for a time, and the several time factors have become known, the operation becomes largely automatic. The apparatus can be made of or lined with rust-proof metal, and thorough washing and sterilizing of the equipment is easily accomplished, by hot water, steam and antiseptics.

The kneading and adding water, commonly employed in the filter-press method are usually unnecessary, with the present process, since the yeast leaves the centrifugal in a very homogeneous condition, whereas this is not the case in the filter press method.

One important disadvantage of the centrifugal filter method of separating yeast from suspensions, as heretofore tried, was the fact that the deposition of the first thin layer of yeast on the filter cloth gave a very closely adherent, dense, not readily permeable surface, which permitted the passage of the liquid therethrough only with extreme slowness. Hence the capacity of such centrifugal filtering unit, per hour, was very small. In the present system this objection is overcome since most of the water in the suspension passes out over the ring dam, i. e., in the overflow-centrifuge phase of the process, leaving only a little water which needs to be passed through the filter cloth.

The present process is highly effective although it combines features of the centrifugal filtration process and the overflow centrifuge process, neither of which has itself proven effective as a system for the separation of compressed yeast from yeast suspensions. The fact that kneading of the separated yeast is not needed, is an important advance in the art.

The apparatus used in the present process is a common sieving centrifuge.

The annexed drawing is a conventional showing of a centrifugal machine which is suitable for use in carrying out the centrifugation, this being a central vertical section. The bowl is rotated at high speed by power applied through the shaft 10, in any suitable manner, the shaft being secured to the back 11 of the bowl by nut 12. The peripheral wall 13 is perforated all over, and a suitable fabric is placed as a lining on the interior surface thereof. 14 is the inlet pipe through which the yeast suspension is delivered to the centrifugal. 15 is a ring dam carried on the bowl 11—13, and preferably made integral therewith. The invention is not restricted to this particular centrifugal machine, but I prefer to use any horizontal type machine.

In operation, the bowl 11—13—15 being rotated at high speed and a filter cloth being already smoothly spread on the interior surface of 13, yeast suspension (washed yeast and water in a flowable milky liquid state) is introduced rapidly through pipe 14. Some of the water passes out through the filter cloth and perforations in 13, into the space 16, and flows off through 17. The centrifugal bowl soon fills up with yeast and water, to the top (interior surface) of the ring dam 15. The yeast in the liquid in the bowl is constantly being separated rapidly into a layer of yeast, on the filter cloth and a supernatant annular body of water. As soon as the water level in the bowl reaches the top of the ring dam 15, clear water begins to flow off through the passage 18 into 19 and 20. On continuing the introduction of suspension through 14, the rapid settling of the yeast from the water in the bowl continues, until there is a mass of solid wet yeast filling the bowl nearly up to the level 18, before the exit liquid from pipe 20 suddenly becomes very cloudy or turbid. The inflow of suspension through 14 is then at once stopped.

Then the spinning of the bowl is continued until this mass of yeast is sufficiently dried (i. e. until sufficient water has been discharged through the filter cloth and perforations). The discharge of the water through the filter cloth and perforations in 13, of course continues throughout the period that water is being discharged through 18—19—20.

The front of the centrifugal machine casing (parts 21, 22, 23 and 24) and the bushing bracket 25 carrying pipe 14, can then all be moved back out of the way, and a conventional chisel-and-chute discharge mechanism can be brought up to remove the compressed yeast, while the bowl is still in rotation.

It will be observed that water being discharged during all of the process, through the perforations in 13, constitutes centrifugal filtration, and that the settling of the yeast from the water and overflow of water at 18 constitutes centrifugal clarification, or the operation of a centrifugal clarifier or overflow centrifuge.

I claim:

1. In the art of separating yeast from an aqueous suspension of yeast the process which comprises flowing an aqueous suspension of yeast into a rapidly rotating centrifugal bowl provided with a circumferential filtering portion which retains yeast while allowing aqueous liquid to pass through the same, said centrifugal bowl being provided with an annular dam extending from the filtering surface toward the axis of rotation, for retaining, within said bowl, a circumferential layer of yeast and aqueous medium, rotating said bowl at a speed which produces the passage of aqueous medium through said filtering portion, and produces the formation of said circumferential layer and the movement of yeast in said circumferential layer outwardly against yeast which accumulates as a layer inwardly of said circumferential filtering portion, the flowing of said suspension of yeast into said rotating bowl being at a rate greater than the rate at which the liquid portion thereof is discharged from the said bowl by passage through said filtering portion, whereby an accumulation of liquid, from which yeast has been separated, tends to form as a part of said circumferential layer in the parts thereof nearest the center of rotation and near enough to the center of rotation to be incapable of being retained by said dam, and discharging at least the major part of said accumulation past said dam to the exterior of said bowl.

2. In the art of separating yeast from an aqueous suspension of yeast, the process which comprises flowing an aqueous suspension of yeast into a centrifugal bowl provided with a circumferential filtering portion which retains yeast while allowing aqueous liquid to pass through the same, said centrifugal bowl being provided with an annular dam extending from the filtering surface toward the axis of rotation, for retaining, within said bowl, a circumferential layer of yeast and aqueous medium, rotating said bowl at a speed which produces the passage of aqueous medium through said filtering portion, and produces the formation of said circumferential layer and the movement of yeast in said circumferential layer outwardly against yeast which accumulates as a layer inwardly of said circumferential filtering portion, the flowing of said suspension of yeast into said rotating bowl being at a rate greater than the rate at which the liquid portion thereof is discharged from the said bowl by passage through said filtering portion, whereby an accumulation of liquid, from which yeast has been separated, tends to form as a part of said circumferential layer in the parts thereof nearest the center of rotation and near enough to the center of rotation to be incapable of being retained by said dam, discharging a portion of said accumulation past said dam to the exterior of said bowl, and continuing the flowing of aqueous suspension of yeast to be separated into said bowl and the discharge of aqueous liquid past said dam, until the part of said accumulation as being discharged past said dam becomes turbid.

3. The process of claim 2 including the steps of continuing the rotation of the bowl until a desired state of dryness of the yeast has been obtained and then stopping such rotation.

4. The process of claim 2 including the steps of continuing the rotation of the bowl while removing yeast from the filtering portion of the bowl.

5. The process of claim 2 including the steps of continuing the rotation of the bowl while running several batches of yeast suspension into the bowl and removing several batches of yeast from the bowl.

MAX JANSEN.